United States Patent [19]
Goetter et al.

[11] 4,424,412
[45] Jan. 3, 1984

[54] SPLICE CASE END CLOSURE ASSEMBLY AND SPLICE CASE INCLUDING SAME

[75] Inventors: Erwin H. Goetter, Chesterland; Ralph B. Siter, Mayfield Heights, both of Ohio

[73] Assignee: Preformed Line Products Company, Cleveland, Ohio

[21] Appl. No.: 334,423

[22] Filed: Dec. 24, 1981

[51] Int. Cl.³ .................. H02G 15/113; H02G 15/117
[52] U.S. Cl. ................................. 174/92; 174/77 R; 174/93; 277/167.5
[58] Field of Search .................... 174/77 R, 92, 93; 285/137 R, DIG. 19; 277/167.3, 167.5, 207 A

[56] References Cited

U.S. PATENT DOCUMENTS

| | | | |
|---|---|---|---|
| 2,060,745 | 11/1936 | Pettee | 174/92 |
| 3,151,209 | 9/1964 | D'Ascoli et al. | 174/77 R |
| 3,337,681 | 8/1967 | Smith | 174/77 R |
| 3,545,773 | 12/1970 | Smith | 174/77 R X |
| 3,692,926 | 9/1972 | Smith | 174/77 R X |
| 3,935,373 | 1/1976 | Smith et al. | 174/92 X |

FOREIGN PATENT DOCUMENTS

| | | | |
|---|---|---|---|
| 2130286 | 1/1972 | Fed. Rep. of Germany | 174/77 R |
| 334761 | 1/1959 | Switzerland | 285/DIG. 19 |

*Primary Examiner*—A. T. Grimley
*Assistant Examiner*—Morris H. Nimmo
*Attorney, Agent, or Firm*—Fay & Sharpe

[57] ABSTRACT

A splice case or vault end closure assembly which includes an inner plate having an inner face, an outer face, and a plurality of apertures arranged in a generally hexagonal array communicating between the faces. An annular recess surrounds each aperture in the outer face and a resilient gasket is partially received in each of these recesses. An outer plate is also provided having an inner face, an outer face, and a plurality of through apertures adapted to register with the inner plate apertures. The inner and outer plates are positioned such that the inner plate outer face is in an opposed relationship to the outer plate inner face with the outer plate inner face contacting the gaskets disposed in the inner plate recesses. Means are provided for drawing the plates toward each other in a controlled fashion to longitudinally compress and radially expand the gaskets into the apertures.

20 Claims, 3 Drawing Figures ately sealing enclosures for linear bodies and, more particularly, to end closures for such structures having the linear bodies penetrating therethrough.

SPLICE CASE END CLOSURE ASSEMBLY AND SPLICE CASE INCLUDING SAME

BACKGROUND OF THE INVENTION

This application pertains to the art of environmentally sealing enclosures for linear bodies and, more particularly, to end closures for such structures having the linear bodies penetrating therethrough.

The invention is particularly applicable to an end closure assembly for splice cases, cable vaults and other electrical cable terminus receiving containers which are exposed to the environment. The invention is particularly designed for use in subterranean and suspended installations for protecting communication cable splices or connections from moisture, humidity, corrosive environments, or the like. It will be appreciated, however, that the invention has broader applications and may be used or adapted to use for a wide variety of other types of cables and/or linear bodies.

Heretofore, end closure assemblies for splice cases, cable vaults and the like have provided an environmental seal with the electrical cables penetrating therethrough by applying a radially compressive or circumferentially constrictive force. Commonly, the closure assemblies included a plurality of cable receiving ports surrounded by outward projecting access inserts or cable stubs which, in turn, were surrounded by radially compressible collars. The compressible collars acted to contract the inner diameters of the cable stubs into tight frictional engagement with the exterior surfaces of cables received therethrough. Such an end enclosure assembly is shown in U.S. Pat. No. 3,935,373. In other assemblies, the entire end closure is radially pressed into tight engagement with the received or associated cables. Such closure assemblies are illustrated and disclosed in, for example, U.S. Pat. Nos. 3,337,681, 3,545,773, and 3,692,926.

Still other sealing arrangements have previously been employed to provide environmental seals for communication cables in this environment. In these arrangements, a resilient gasket material is longitudinally compressed within a confined region. Specifically, an outer sleeve or casing receives the cables and the resilient gasket material. A pair of end plates receivable in the sleeve or casing at each end of the gasket material include cable receiving passages extending therethrough. As the end plates are drawn or pressed together and longitudinally compress the gasket material, the material expands firmly against the sleeve inner wall and against the electrical cables to thus effect the desired sealing.

These prior art end closure assemblies have commonly been constructed of plastic and rubber materials. Even those assemblies which included metal plates or components have included large amounts of plastic or rubber gasket material. The plastic and rubber materials are flammable and have little or no flame retardant properties. Further, the prior art end closure assemblies are only capable of accommodating a relatively limited number of cables. Moreover, many of the prior art end closures have individual seal engaging mechanisms for each cable or require other time-consuming and awkward manipulations during installation.

The present invention contemplates a new and improved end closure assembly by receiving linear bodies such as communication cables and the like in an environmentally sealed relationship which overcomes the above-referenced problems and others. This new end closure assembly is versatile, easy to use and manipulate, long lasting, fire retardant, and is readily adapted to receive additional or replacement cables subsequent to initial installation.

BRIEF SUMMARY OF THE INVENTION

In accordance with the present invention, there is provided a new end closure assembly for splice cases or vaults used in connection with linear bodies such as communication cables and the like. The new assembly is comprised of cooperating inner and outer plates having a plurality of axial apertures disposed in registry with each other and adapted to receive linear bodies therethrough. Seal means interposed between the plates is positioned in close surrounding relationship with each pair of registered openings. Means are also provided to selectively draw the plates toward each other for compressing the seal means and thus cause it to frictionally engage the linear bodies.

More particularly, the end closure assembly includes an inner end plate, an outer end plate, resilient gasket means and means for pressing or drawing the inner and outer plates together for compressing the gasket means. The inner end plate has an inner face, an outer face and a plurality of apertures extending longitudinally between the faces. The outer end plate also has an inner face an outer face, and a plurality of apertures extending therethrough between the faces. The apertures of the inner and outer end plates are adapted to be placed in registry with each other. At least one of the inner end plate outer face and the outer end plate inner face includes a plurality of annular recesses with one such recess surrounding each aperture. Gasket means is at least partially received in each annular recess such that as the inner and outer end pieces are pressed or drawn together, the gasket means is longitudinally compressed and transversely expanded into the apertures. Such gasket means movement causes a seal to be formed with electrical cables or other linear bodies passing through the apertures.

In accordance with another aspect of the invention, a splice case is provided which includes at least one of the new end closure assemblies.

One advantage of the present invention resides in the ease of installation for the new end closure assembly and the ease with which linear bodies such as communication cables or the like may be added to or removed from association therewith.

Another advantage of the invention is the capability of accommodating a relatively large number of cables in a secure, environmentally sealed relationship.

Yet another advantage of the invention is the provision of an end enclosure assembly which is flame retardant.

Still further advantages will become apparent to others upon a reading and understanding of the following detailed description of the preferred embodiment.

BRIEF DESCRIPTION OF THE DRAWINGS

The invention may take physical form in various parts and arrangements of parts, a preferred embodiment of which will be described in detail in this specification and illustrated in the accompanying drawings which form a part hereof and wherein.

DETAILED DESCRIPTION OF THE PREFERRED EMBODIMENT

Figure 1:
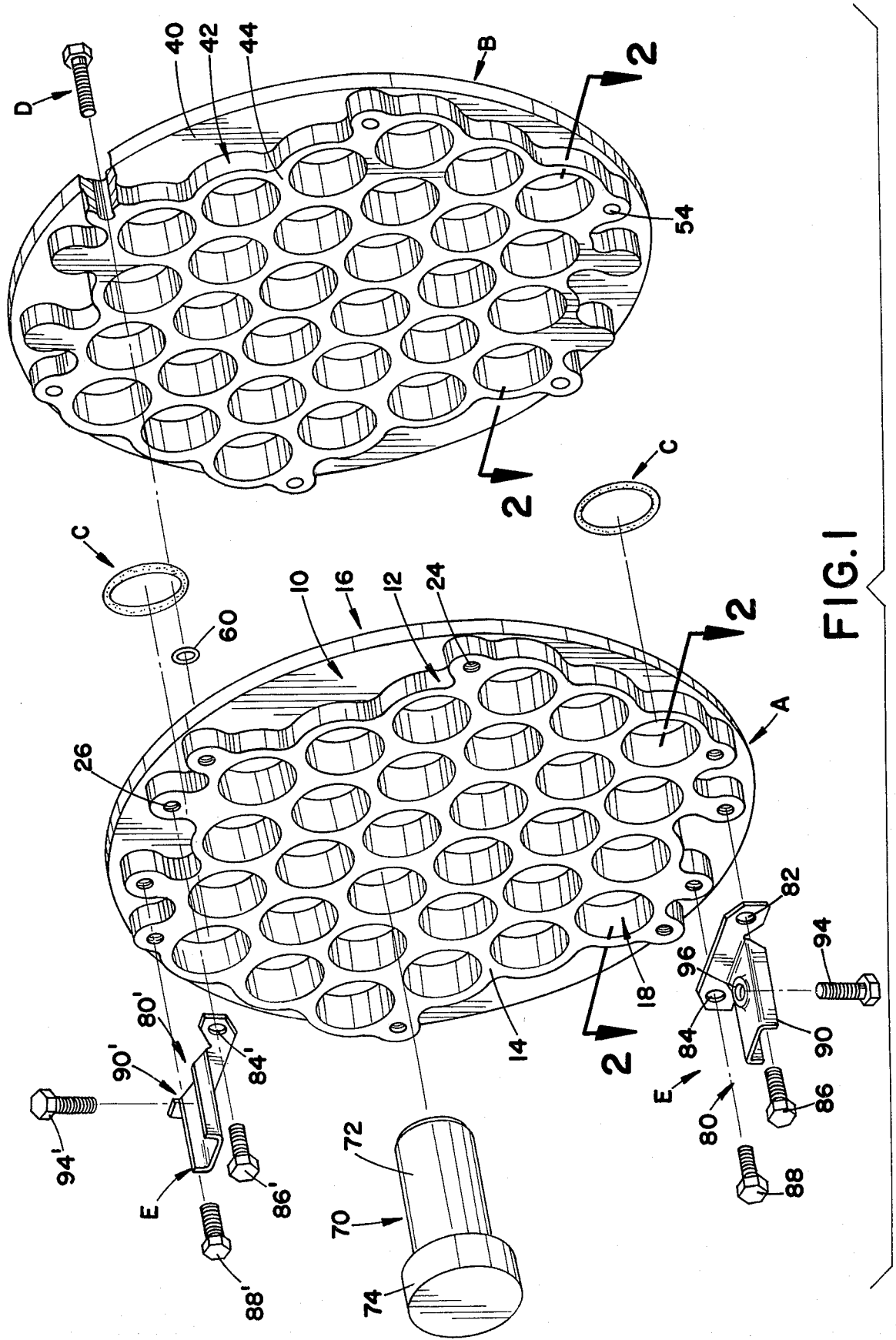
FIG. 1 is an exploded perspective view in partial cross-section of an end closure assembly constructed in accordance with the present invention.

With particular reference to FIG. 1, the new end closure assembly includes an inner end piece or plate A and an outer end piece or plate B. Interposed between inner and outer plates A,B are a plurality of gasket means with two such means being shown and identified by letter C. A plurality of threaded fasteners are employed to interconnect plates A and B with one such fastener being shown and identified by letter D. These fasteners facilitate drawing the inner and outer plates together for compressing the gasket means C in a manner to be described. Disposed on inner plate A is a pair of torque bar mounting brackets E for mounting torque bars in a splice case assembly as will be described.

Figure 2:
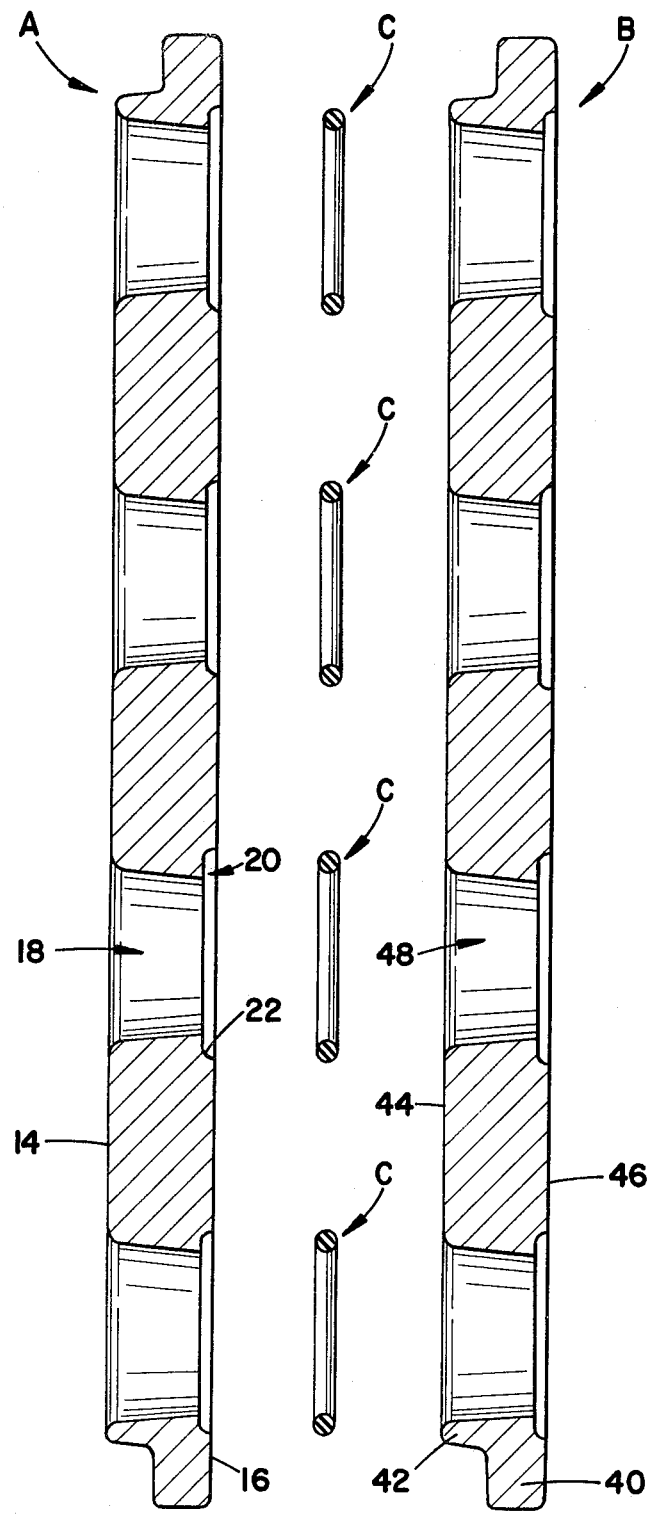
FIG. 2 is a cross-sectional view taken along lines 2—2 of FIG. 1.

With reference to both FIGS. 1 and 2, inner plate A includes a circular base portion 10 and a raised portion 12 which enhances the rigidity of the plate. The inner plate also has an inner or first face 14 and an outer or second face 16. Faces 14,16 are substantially planar and disposed in a generally planar relationship with each other. A plurality of generally circular apertures or ports 18 extend axially through plate A between the inner and outer faces. Apertures 18 have a cross-sectional shape and size which is selected to conform with the exterior surface of linear bodies, such as communication cables or the like, which are to be received therethrough. In addition, the apertures are arranged in a close packed generally hexagonal array to maximize the number of apertures which can be accommodated by the plate.

Disposed circumferentially around each of apertures 18 at inner plate outer face 16 is an annular recess 20. Each recess 20 has an arcuate portion 22 adjacent the outer wall thereof, is open to the aperture 18 at one edge and is open to plate outer face 16 at another edge. Each gasket means C is adapted to be at least partially received in an associated recess 20 and extend axially outward therefrom to be contacted and deformed by outer plate B at assembly in a manner to be described. Optionally, the gasket means may be fully recessed in annular recesses 20 and the outer plate may include annular projections for penetrating the recesses to contact the gasket means. As yet another option, the annular recesses may be canted toward the apertures to provide a convenient surface for camming the gasket means into the apertures.

The inner plate further includes a plurality of threaded openings or bores 24 for threadedly receiving fasteners D. In the preferred embodiment shown, six such openings are provided with one being located at generally each corner of the hexagonal aperture array. However, other locations for and/or numbers of openings 24 could also be advantageously employed. Moreover, a plurality of threaded openings 26 are provided in plate A for accommodating torque bar mounting brackets E.

Continuing with reference to FIGS. 1 and 2, outer plate B includes a circular base portion 40 and a raised portion 42 similar to that of the inner plate. The outer plate has a generally planar inner face 44 and a planar outer face 46. Inner face 44 generally conforms to inner plate outer face 16 and a plurality of generally circular apertures 48 extend axially through the outer plate between faces 44,46. These apertures are disposed in a close packed hexagonal array and are adapted to be placed in registry with inner plate apertures 18. Inner and outer plate apertures 18,48 are dimensioned and disposed with sufficient conformity that linear bodies, such as electrical cables or the like, may be passed through corresponding apertures in both plates. Outer plate B further includes a plurality of through openings 54 disposed in registry with inner plate threaded openings 24 for receiving threaded fasteners D. As best shown in FIG. 2, plates A and B are virtually identical to each other. Use of identical plates is advantageous in that the number of separate or different components required for the overall end closure assembly may be effectively reduced. Optionally, the outer plate inner face 44 may be configured to include annular recesses surrounding apertures 48. These recesses may be in addition to or in place of inner plate annular recesses 20.

Preferably, the inner and outer plates are constructed of cast aluminum, although other metallic or non-flammable materials may advantageously be employed. The thickness of raised portions 12,42 act to space gasket means C a substantial distance from regions which can support combustion to thus improve or enhance the flame retardant characteristics. If flame retardance is not required, the inner and outer plates may be constructed of plastic or other flammable material.

With continued reference to FIGS. 1 and 2, gasket means C, in the preferred embodiment, comprises a plurality of O-rings dimensioned for partial receipt in annular recesses 20. If, however, the recesses have a slight elongation, the gaskets may comprise annular sleeves. Other types of gasket means could also be advantageously employed if desired without in any way departing from the scope of the present invention. The O-rings project slightly from recesses 20 toward the outer plate inner face 44 such that as the inner and outer plates are cammed or drawn toward each other, the O-rings are compressed longitudinally and expand transversely or radially into registered apertures 18,48. This reduces the effective diameter of the apertures and causes a frictional seal to occur between the O-rings and the received linear bodies. In addition, the frictional engagement between the O-rings and linear bodies acts as a retaining means.

To facilitate ease of assembly, the O-rings may be conveniently interconnected with each other as by a thin web or tabs to thus form a single gasket structure. The gasket material comprises a synthetic rubber, plastic or other material which is resilient and retains its resiliency with age and/or exposure to high temperatures, freezing temperatures, water,, pollutants in the air, sunlight and the like. Although a material which permanently deforms under pressure may find utility for some installations, a resilient gasket material having a good memory property is preferred. This allows the gasket material to be repeatedly compressed and relaxed for enabling linear bodies to be added or removed through the end plate assembly as desired at subsequent initial installation.

In the preferred emodiments, fasteners D comprise six bolts or machine screws which pass through the six hexagonally arranged through openings 54 in outer plate B and are threadedly received into the six corresponding threaded openings 24 in inner plate A. The bolts are threadedly advanced in openings 24 until the gasket means C is placed in light physical contact between recesses 20 and outer plate inner face 44. The linear bodies, e.g., communication cables or the like, may then be inserted through the apertures. Once the bodies have been positioned in the apertures, the torque on fasteners D is further adjusted for obtaining the desired cooperative relationship between the linear bodies and the gasket means surrounding the associated apertures. That is, fasteners D are further torqued so that the gasket means will be longitudinally compressed and radially expanded into a close sealing and retaining relationship with the linear bodies.

If the exterior cross-section of the cables is in close conformity with the cross-section of the apertures 18,48, a spacing means 60 (FIG. 1) may be advantageously employed between the inner and outer plates for limiting the amount or degree to which the gasket means may be compressed. As previously noted, the number of threaded fasteners D utilized may vary and will, at least to some degree, be dependent upon the rigidity and size of the inner and outer plates. For example, if the rigidity of the inner or outer plates is decreased, it would become advantageous to utilize additional fasteners around the periphery or through the center region of the plates.

Referring specifically to FIG. 1, all of apertures 18,48 will not receive a linear body in many installations. To maintain the interior of the closure or vault hermetically sealed, a plug 70 is inserted into each of the unused aperture pairs. Each plug 70 includes a tubular body portion 72 having a cross-section in substantial conformity with the cross-section of the linear bodies and a length which is generally slightly greater than the combined axial lengths of apertures 18,48 to compensate for any gap between the inner and outer plates in the assembled condition. This overall arrangement enables body portion 72 to be inserted into the apertures and to thereafter be sealed and retained by associated O-ring in the same manner as the linear bodies when plates A and B are drawn toward each other. Each plug further includes a slightly enlarged collar portion 74 which abuts the inner plate inner face 14 for limiting the extent of plug insertion into an aperture.

Figure 3:
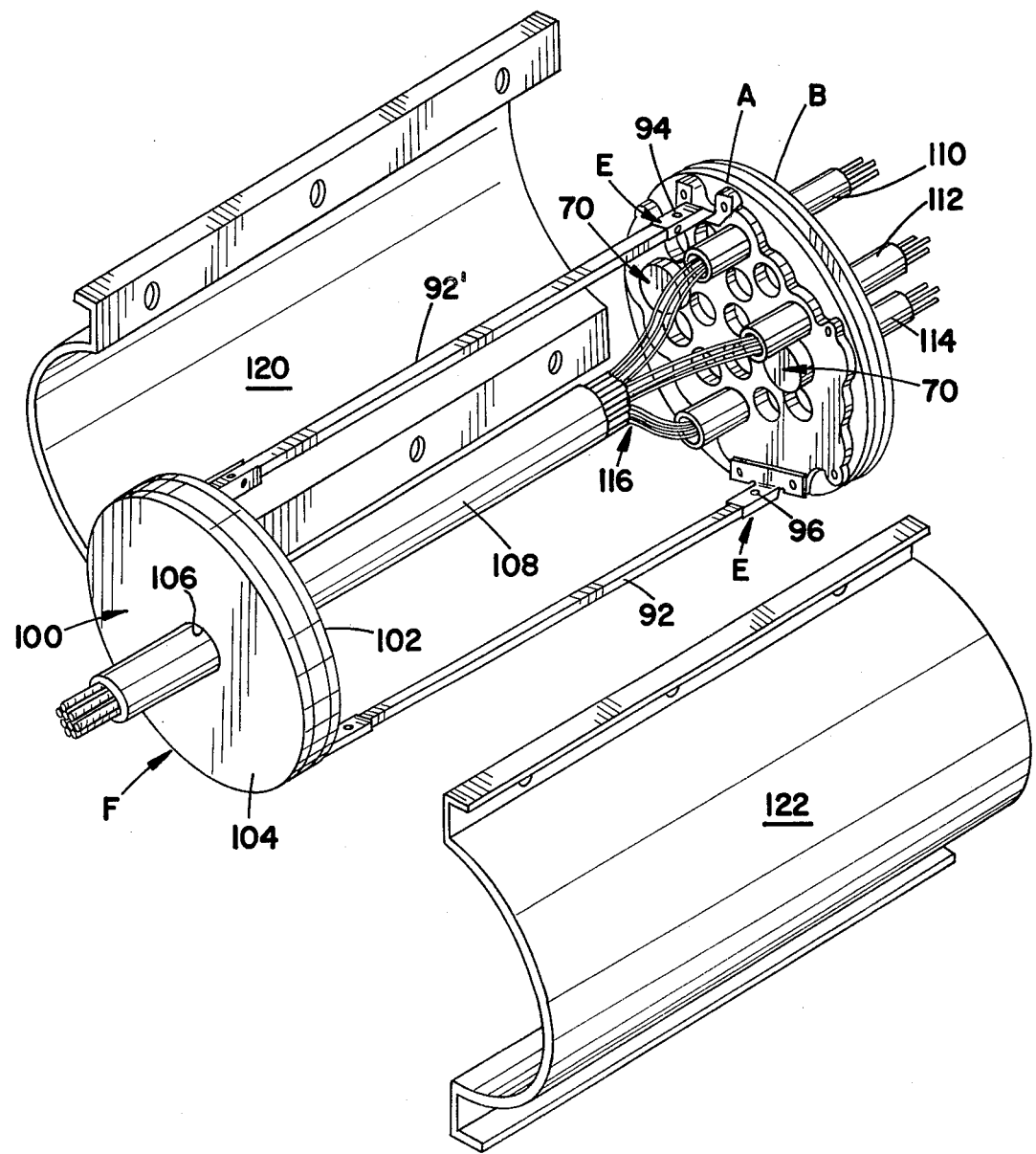
FIG. 3 is a perspective view of a splice case including end closure assemblies constructed in accordance with the present invention.

With reference to FIGS. 1 and 3, torque bar mounting brackets E includes a pair of like bracket members 80 and 80' in which, for simplicity of illustration, like parts are identified by like numerals with a primed (') suffix. Description will hereinafter be made with reference to bracket member 80, it being appreciated that mounting bracket 80' is identical thereto unless otherwise specifically noted.

Bracket member 80 includes a pair of bores 82,84 which receive securing means such as bolts 86,88. Bolts 86,88 are threadedly received by threaded openings 26 in inner plate A to secure the mounting bracket to plate inner face 14. The bracket member also includes a generally U-shaped channel 90 disposed so as to be located substantially perpendicular to inner face 14 when the member is fixedly secured to plate A. The U-shaped channel opens radially outward of the plate and receives an elongated connecting member or bar torque 92 (FIG. 3). A bolt 94 extends through an aperture in bar 92 and is threadedly received in a threaded hole 96 in channel 90.

With particular reference to FIG. 3, a second end closure assembly F is connected with the other end of bars 92 and 92' to define a splice cage. Although this second end closure assembly may be identical to the first end closure assembly as above described in detail, it is contemplated that in a typical installation the second end closure assembly will comprise a known type of such assembly. The specific details of second end closure assembly F do not comprise a part of the present invention; however, one type of structure which could be satisfactorily employed is shown and described in U.S. Pat. No. 3,545,773.

As shown, second end closure assembly F includes a body 100 having an inner face 102 and an outer face 104. An aperture 106 extends through body 100 between faces 102,104 and is dimensioned to receive a linear body or cable therethrough. Also, the second end closure assembly includes means for placing body 100 in an environmentally sealed relationship with a cable received through apertures 106. Cables or the like are received through the apertures in the first and second end closure assemblies, respectively, and are joined or spliced together at their inner terminal ends in the manner desired. As illustrated in FIG. 3, a single large cable 108 penetrates second end closure assembly F and three smaller cables 110,112,114 penetrate first end closure assembly A-B. Appropriate portions of cable 108 are spliced as at splice area 116 to cables 110,112,114 by conventional means to effect a desired operative interconnection therebetween. During the process of inserting cables 110,112,114 through the associated apertures in first end closure assembly A-B, it may be highly advantageous to apply a lubricating material to the innermost end areas of the cables and around the associated apertures. This then reduces the amount of frictional resistance to insertion due to close fitting relationships between the cables and apertures.

A pair of arcuate side members 120 and 122 are adapted to be releasably interconnected to each other along opposed mounting flanges in a close surrounding relationship with the end closure assemblies and connecting bars to complete the splice case. Before final assembly, a sealing plug 70 is inserted in each aperture of the first end closure assembly A-B which does not contain a cable. In FIG. 3, however, only a few of these plugs have been shown for ease of illustration. If desired, resilient gaskets may be interposed between the mating areas or flanges of side members 120,122 and between the side members and the end closure assemblies to seal the splice case more thoroughly.

The invention has been described with reference to the preferred embodiment. Obviously, alterations and modifications will occur to others upon a reading and understanding of the specification. It is intended to include all such alterations and modifications insofar as they come within the scope of the appended claims or the equivalents thereof.

Having thus described the invention, it is now claimed:

1. A vault end closure assembly adapted to receive a plurality of linear bodies in an environmentally sealed relationship, the end closure assembly comprising:
   an inner end plate having an inner face, an outer face and a plurality of apertures extending through said inner end plate between the inner and outer faces thereof;
   an outer end plate having an inner face, an outer face and a plurality of apertures extending therethrough between the outer end plate inner and outer faces, the apertures in said inner and outer plates being located for registry with each other;

a plurality of annular recesses disposed in at least one of the inner end plate outer face and the outer end plate inner face in a surrounding relationship with said apertures;

body means passing through each of said plurality of registered apertures in said inner and outer end plates;

compressible gasket means at least partially received in said annular recesses; and, means for drawing the inner and outer end plates axially toward each other in a controlled manner such that said gasket means is compressed longitudinally and expanded radially into the apertures, whereby seals will be formed between the gasket means and said body means which passes through each pair of said registered apertures in the inner and outer plates and between the gasket means and the inner and outer plates to establish the environmentally sealed relationship.

2. The end closure assembly as defined in claim 1 wherein said plurality of apertures in said inner and outer end plates are arranged in close packed generally hexagonal arrays.

3. The end closure assembly as defined in claim 1 wherein the annular recesses open into both the associated aperture and the associated face, whereby said gasket means expands into said apertures as said end plates are drawn toward each other by said drawing means.

4. The end closure assembly as defined in claim 3 wherein the gasket means comprises at least one O-ring disposed in each annular recess.

5. The end closure assembly as defined in claim 4 further including spacing means for providing a predetermined minimum axially spaced relationship between the inner end plate outer face and the outer end plate inner face.

6. The end closure assembly as defined in claim 1 wherein said drawing means comprises a plurality of threaded openings in one of the inner and outer end plates and a corresponding plurality of threaded members which pass through openings in the other of the inner and outer end plates into threaded engagement with said threaded openings such that rotation of the threaded members causes said end plates to be drawn toward each other and permits said end plates to be moved apart from each other.

7. The end closure assembly as defined in claim 6 wherein said threaded openings are disposed in a generally hexagonal array.

8. The end closure assembly as defined in claim 1 wherein said annular recesses are disposed in the inner end plate outer face and wherein the outer end plate inner face is substantially planar, said gasket means being compressed between the annular recesses and the outer end plate inner face.

9. The end closure assembly as defined in claim 1 wherein said body means includes a plurality of plugs each having an exterior cross-section in substantial conformity with the interior cross-section of said apertures, each plug being received in at least a selected one of said apertures in a sealing relationship therewith when the gasket means is compressed between the inner and outer end plates.

10. The end closure assembly as defined in claim 9 wherein each plug includes a stop for limiting the axial extent to which the plug is received in an associated aperture.

11. A splice case for receiving a plurality of linear bodies to be spliced and for protecting the splice from the environment, said splice case comprising:

a first end closure assembly comprising an inner end plate having an inner face, an outer face and a plurality of apertures extending axially therethrough; and outer end plate having an inner face disposed contiguous with the inner end plate outer face, an outer face and a plurality of apertures extending axially therethrough in registry with the inner end plate apertures; a plurality of annular recesses disposed in at least one of the inner end plate outer face and the outer end plate inner face; gasket means at least partially received in the recesses; and, means for drawing the inner and outer end plates axially toward each other such that the gasket means is compressed longitudinally and expanded radially into the inner and outer end plate apertures, whereby said gasket means is adapted to be placed in an environmental sealing relationship with first body means extending through each pair of said registered apertures in said inner and outer end plates;

a second end closure assembly having an inner face, an outer face, and at least one aperture extending axially thereof between said inner and outer faces adapted to receive in an environmental sealing relationship second body means adapted for extending axially therethrough;

at least a pair of elongated members extending axially of and operatively connected with the first and second end closure assemblies for retaining said inner end plate inner face and said second end closure assembly inner face in a generally predetermined laterally spaced apart relationship; and, cover members closely received circumferentially of said first and second end closure assemblies for defining an enclosed splice chamber therebetween, said cover members being releasably disposed in an environmental sealing relationship with each other and with said end closure assemblies whereby the interior of the splice case is maintained hermetically sealed.

12. The splice case as defined in claim 11 further including first body means extending through pairs of said registered apertures in said inner and outer end plates, said first body means comprising plugs having exterior cross-sections in substantial conformity with the interior cross-sections of the associated registered apertures in said first end closure assembly, said plugs being received in selected ones of said first end closure assembly apertures in an environmentally sealed relationship therewith when said gasket means is compressed between the inner and outer plates comprising said first end closure assembly.

13. The splice case as defined in claim 12 further including mounting brackets for operatively connecting said elongated members with said first and second end closure assemblies, each mounting bracket including means for connecting the bracket with an associated one of said first and second end closure assemblies and means for receiving one end portion of an associated elongated member.

14. The splice case as defined in claim 13 wherein said receiving means comprises a generally U-shaped channel.

15. The splice case as defined in claim 14 further including means for fixedly securing each elongated member adjacent the opposed ends thereof in the generally U-shaped channels of the associated mounting brackets.

16. The splice case as defined in claim 12 wherein the gasket means includes a plurality of O-rings with each O-ring being disposed in an associated one of said annular recesses.

17. The splice case as defined in claim 16 wherein the drawing means comprises a plurality of threaded openings in one of the inner and outer end plates, a plurality of unthreaded openings extending through the other of said inner and outer end plates and a plurality of threaded members passing through said unthreaded openings into threaded engagement with said threaded openings, advancement of said threaded members in said threaded openings causing said inner and outer end plates to be drawn toward each other for compressing said first gasket means therebetween.

18. The splice case as defined in claim 17 wherein the apertures extending through the inner and outer plates of said first end closure assembly are disposed in a generally hexagonal array.

19. The splice case as defined in claim 11 wherein said second end closure assembly is substantially identical in construction to said first end closure assembly.

20. The closure assembly of claim 1 wherein said inner and outer end plates are made of a flame retardant material.

* * * * *

UNITED STATES PATENT AND TRADEMARK OFFICE
CERTIFICATE OF CORRECTION

PATENT NO. : 4,424,412

DATED : January 3, 1984

INVENTOR(S) : Erwin H. Goetter et al

It is certified that error appears in the above-identified patent and that said Letters Patent is hereby corrected as shown below:

Claim 11, line 7, "and" should read -- an --.

Claim 11, line 28, delete "adapted for".

Signed and Sealed this

Twenty-seventh Day of March 1984

[SEAL]

Attest:

GERALD J. MOSSINGHOFF

Attesting Officer

Commissioner of Patents and Trademarks